United States Patent
Willey et al.

(10) Patent No.: US 7,346,019 B2
(45) Date of Patent: Mar. 18, 2008

(54) METHODS AND APPARATUS FOR PROVIDING A TOLERABLE DELAY FOR SLOTTED MESSAGES IN WIRELESS COMMUNICATION NETWORKS

(75) Inventors: William Daniel Willey, San Francisco, CA (US); Muhammad Khaledul Islam, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 289 days.

(21) Appl. No.: 11/006,090

(22) Filed: Dec. 7, 2004

(65) Prior Publication Data

US 2005/0201311 A1    Sep. 15, 2005

Related U.S. Application Data

(60) Provisional application No. 60/527,865, filed on Dec. 8, 2003.

(51) Int. Cl.
*H04Q 7/00* (2006.01)

(52) U.S. Cl. .................................. 370/313; 370/314

(58) Field of Classification Search ................ 370/310, 370/342, 335, 441, 348, 313–314, 280, 337, 370/442; 455/507–515
See application file for complete search history.

(56) References Cited

U.S. PATENT DOCUMENTS

| | | | | |
|---|---|---|---|---|
| 5,511,110 | A * | 4/1996 | Drucker | 455/458 |
| 5,802,046 | A * | 9/1998 | Scott | 370/280 |
| 6,157,816 | A * | 12/2000 | Anderson et al. | 340/7.32 |
| 6,477,382 | B1 * | 11/2002 | Mansfield et al. | 455/458 |
| 6,680,930 | B2 * | 1/2004 | Newberg et al. | 370/348 |
| 6,990,341 | B2 * | 1/2006 | Kang et al. | 455/434 |
| 2003/0054820 | A1 | 3/2003 | Kang et al. | |
| 2003/0148800 | A1 * | 8/2003 | Lee | 455/574 |
| 2004/0157626 | A1 | 8/2004 | Park et al. | |
| 2005/0118981 | A1 | 6/2005 | Laroia et al. | |

OTHER PUBLICATIONS

PCT Search Report & Written Opinion for Application PCT/US04/40846, Jul. 14, 2006.
European Search Report for EP Application #04817019.5, Dated May 2, 2007.

* cited by examiner

*Primary Examiner*—Matthew Anderson
*Assistant Examiner*—Angelica M. Perez
(74) *Attorney, Agent, or Firm*—John J. Oskorep, Esq.

(57) ABSTRACT

In one illustrative example, a plurality of page message requests for a plurality of mobile devices which operate in a wireless communication network are received. One or more paging slots assigned to the mobile devices are identified for transmitting a plurality of page messages in response to these requests. However, the wireless network refrains from causing a page message for the mobile device associated with a tolerable delay indication to be transmitted within the one or more paging slots when a paging capacity limit of the one or more paging slots is reached. This allows higher priority page messages to be transmitted within the one or more paging slots. The wireless network subsequently causes a page message for the mobile device having the tolerable delay indication to be transmitted within one or more subsequent paging slots within a tolerable delay period corresponding to the tolerable delay indication. The mobile device may transmit the tolerable delay indication to the wireless network in response to identifying a predetermined condition, for example, identifying use of a high capacity power source.

51 Claims, 6 Drawing Sheets

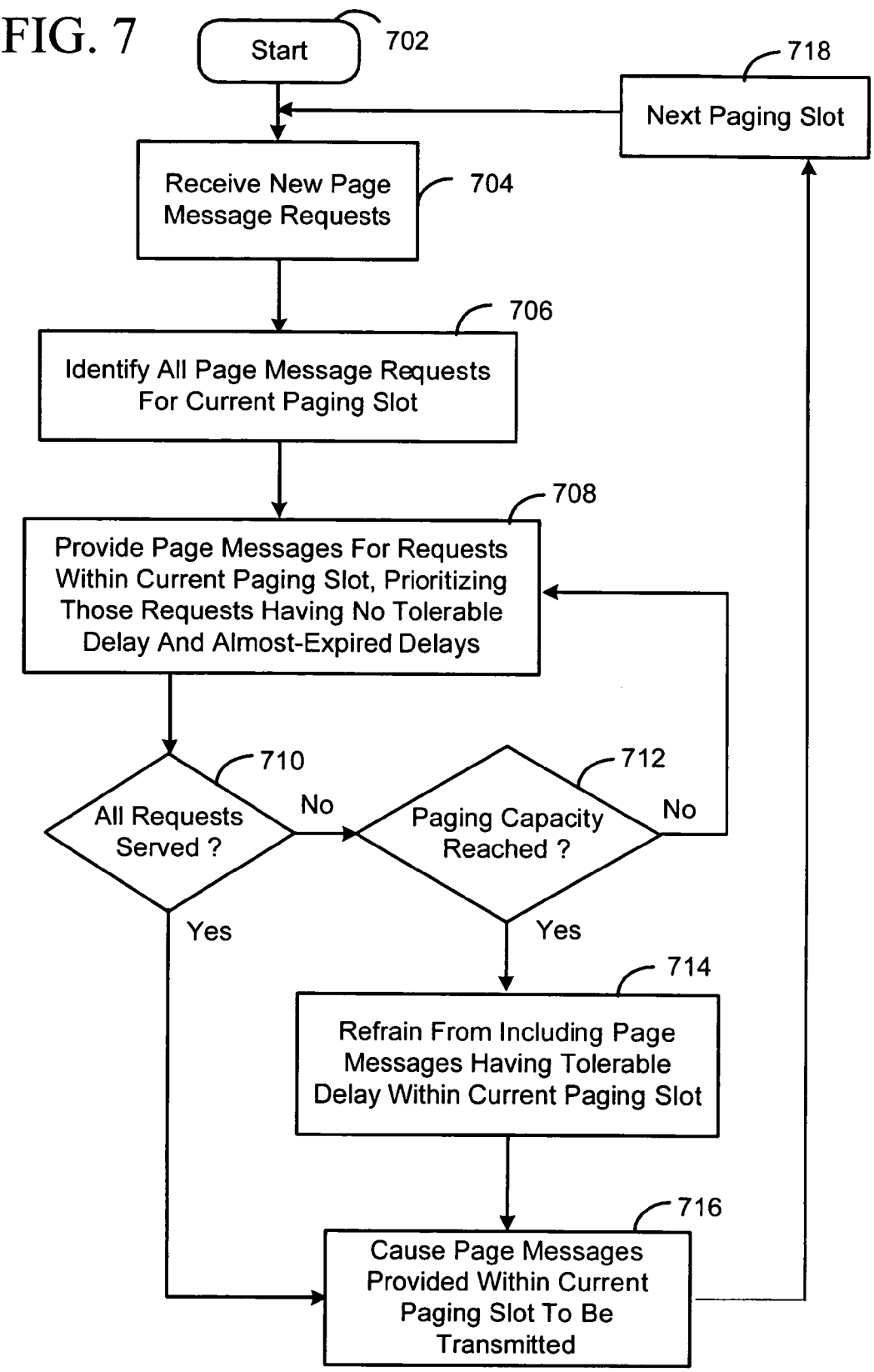

METHODS AND APPARATUS FOR PROVIDING A TOLERABLE DELAY FOR SLOTTED MESSAGES IN WIRELESS COMMUNICATION NETWORKS

CROSS-REFERENCE TO RELATED APPLICATION

This application claims priority to a U.S. Provisional Patent Application entitled "Method Of Required Slot Cycle Indication For Slotted Messaging" having Ser. No. 60/527,865 and filed on 8 Dec. 2003, which is hereby incorporated by reference herein.

BACKGROUND

1. Field of the Technology

The present application relates generally to mobile stations operating in a wireless communication network, and more particularly to methods and apparatus for providing a tolerable delay for slotted messages in wireless networks.

2. Description of the Related Art

A wireless communication device, such as a mobile station operating in a cellular telecommunications network, may provide for both voice telephony and data communications. A mobile station may, for example, be compatible with 3$^{rd}$ Generation (3G) communication standards (such as IS-2000 Release 0) and utilize Global System for Mobile Communications (GSM), Time Division Multiple Access (TDMA), or Code Division Multiple Access (CDMA) wireless network technologies.

In CDMA communications defined by IS-2000, a mobile station operating in a normal slotted mode wakes up to monitor for page messages in paging slots at an interval of 1.28*2^i seconds, where i is an integer value ranging from 0 to 7. The value of i is referred to as a "Slot Cycle Index" and is chosen by the mobile station and registered with the infrastructure. Slotted messaging has been utilized in wireless communication networks for many years in an effort to conserve battery power in mobile stations.

In Release D of IS-2000, a new feature that allows mobile stations to operate in a "reduced slotted mode" while idling and monitoring for pages has been defined. Specifically, values of −4 to −1 are allowed as possible values for the Slot Cycle Index i for the reduced slotted mode. This enables faster call setup times for mobile-terminated calls. A shortened slot cycle for faster call setup is highly desirable for certain applications, such as Push-To-Talk (PTT) communication applications. The reduced slotted mode may be negotiated between the mobile station and the infrastructure at the time of call release, for example. In this case, the agreed upon value of i for the reduced slotted mode is active for a period of time before the mobile station and the infrastructure revert to the prior value of i for the normal slotted mode. Furthermore, when the mobile station is idle a new value of i can be negotiated to be active for a period of time.

Another reason that a mobile station may request to operate in the reduced slotted mode is unrelated to the need for fast call setup or PTT communications. In particular, if a mobile station is operating with a relatively high capacity or large power source (e.g. a wall power source, an automobile power source, or a PC power source through USB connection), it may request a shortened slot cycle as power savings is not a concern. The mobile station requests the reduced slot cycle in order to benefit from reduced call setup times even when another feature that requires it (e.g. PTT communications) is not active.

One problem is that, if the infrastructure has more pages queued for a particular paging channel slot than can actually fit in the slot, the infrastructure has no way to appropriately prioritize the pages. This becomes more problematic when many mobile stations in the wireless network are operating in the reduced slotted mode. Some of the pages may be destined for mobile stations having active PTT communications that require fast call setup, whereas other pages may be destined for mobile stations that do not necessarily require the fast call setup (e.g. high capacity power source use). Currently the infrastructure has no suitable technique for prioritizing pages to send within paging slots given these observations.

Other systems may exhibit similar problems. Accordingly, what are needed are improved techniques for slotted messaging in wireless communication networks.

SUMMARY

Methods and apparatus for providing a tolerable delay for slotted messages in a wireless communication network are described herein. In one illustrative example, a plurality of page message requests for a plurality of mobile devices which operate in the wireless network are received. One or more paging slots assigned to the mobile devices are identified for transmitting a plurality of page messages in response to these requests. However, the wireless network refrains from causing a page message for a mobile device associated with a tolerable delay indication to be transmitted within the one or more paging slots when a paging capacity limit of the one or more paging slots is reached. This allows higher priority page messages to be transmitted within the one or more paging slots. Subsequently, the wireless network causes a page message for the mobile device with the tolerable delay indication to be transmitted within one or more subsequent paging slots within a tolerable delay period associated with the tolerable delay indication. The mobile device may transmit the tolerable delay indication to the wireless network in response to identifying a predetermined condition, for example, identifying use of a high capacity power source at the mobile device.

BRIEF DESCRIPTION OF THE DRAWINGS

Embodiments of present application will now be described by way of example with reference to attached figures, wherein:

FIG. 7 is a flowchart for describing a network method of providing a tolerable delay for slotted messages in the wireless network.

DETAILED DESCRIPTION OF THE PREFERRED EMBODIMENTS

Methods and apparatus for providing a tolerable delay for slotted messages in a wireless communication network are described herein. In one illustrative example, a plurality of page message requests for a plurality of mobile devices which operate in the wireless network are received. One or more paging slots assigned to the mobile devices are identified for transmitting a plurality of page messages in response to these requests. However, the wireless network refrains from causing a page message for a mobile device associated with a tolerable delay indication to be transmitted within the one or more paging slots when a paging capacity limit of the one or more paging slots is reached. This allows higher priority page messages to be transmitted within the one or more paging slots. The wireless network subsequently causes a page message for the mobile device with the tolerable delay indication to be transmitted within one or more subsequent paging slots within a tolerable delay period associated with the tolerable delay indication. The mobile device may transmit the tolerable delay indication to the wireless network in response to identifying a predetermined condition, for example, identifying use of a high capacity power source at the mobile device.

Figure 1:
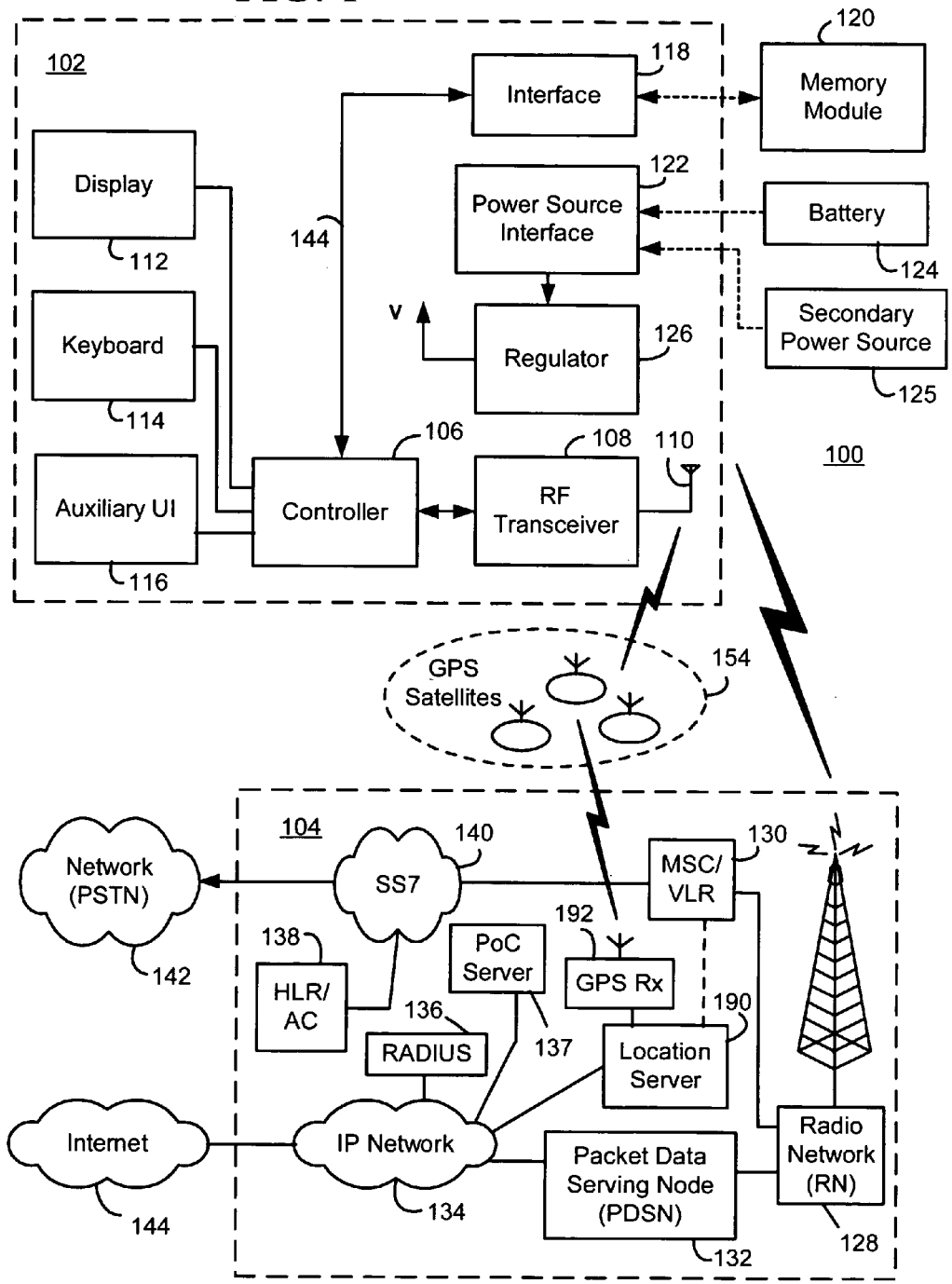
FIG. 1 is a block diagram which illustrates pertinent components of a mobile communication device and a wireless communication network.

FIG. 1 is a block diagram of a communication system 100 which includes a mobile communication device 102 which communicates through a wireless communication network 104. Mobile device 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile device 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs.

Mobile device 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile device 102 is intended to operate. When mobile device 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile device 102 includes a power source interface 122 for receiving one or more rechargeable batteries 124. Battery 124 provides electrical power to electrical circuitry in mobile device 102, and power source interface 122 provides for a mechanical and electrical connection for battery 124. Power source interface 122 is coupled to a regulator 126 which regulates power to the device. Power source interface 122 is also adapted to connect with a secondary power source 125. Secondary power source 125 is a larger or higher capacity power source than battery 124. Secondary power source 125 provides an indefinite supply of power to mobile device 102. Secondary power source 125 may be, for example, an AC wall power source, an automobile power source through a "cigarette lighter" or other suitable connection, or a PC power source through a Universal Serial Bus (USB) connection.

Mobile device 102 operates using a memory module 120, such as a Subscriber Identity Module (SIM) or a Removable User Identity Module (R-UIM), which is connected to or inserted in mobile device 102 at an interface 118. As an alternative to a SIM or an R-UIM, mobile device 102 may operate based on configuration data programmed by a service provider into a non-volatile memory of mobile device 102. Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary UIs 116. Controller 106 is either embodied as the computer's CPU or a separate CPU within the modem unit. It is also contemplated that a computer or other equipment not normally capable of wireless communication may be adapted to connect to and effectively assume control of RF transceiver circuitry 108 and antenna 110 of a single-unit device such as one of those described above. Such a mobile device 102 may have a more particular implementation as described later in relation to mobile station 202 of FIG. 2.

Mobile device 102 communicates in and through wireless communication network 104. In the embodiment of FIG. 1, wireless network 104 is a Second Generation (2G) or Third Generation (3G) supported network based on Code Division Multiple Access (CDMA) technologies. In particular, wireless network 104 is a CDMA2000® network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN) which may connect mobile device 102 with other call parties such as a call party 150 (e.g. a landline telephone or other mobile station) or an emergency call center 152. On the other hand, IP network 134 is communicatively coupled to another network 144 such as the Internet. Note that CDMA2000® is a registered trademark of the Telecommunications Industry Association (TIA-USA).

During operation, mobile device 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile device 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile device 102 user's profile) as well as temporary data (such as mobile station's 102 current location) are stored in a HLR/AC 138. In case of a voice call to mobile device 102, HLR/AC 138 is queried to determine the current location of mobile device 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile device 102 is also authenticated on system access by HLR/AC 138. In order to provide packet data services to mobile device 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 includes position tracking components for tracking the locations of mobile stations. Location information of mobile stations is obtained based on Global Positioning System (GPS) techniques utilizing GPS satellites of a conventional GPS system 154. In the typical configuration, GPS system 154 includes twenty-four (24) GPS satellites that circle the earth every twelve (12) hours. In the present application, mobile device 102 obtains GPS information based on signals received from GPS system 154 and utilizes a location server 190 in wireless network 104 to measure and obtain its location. Location server 190 is connected to MSC 130 and/or IP network 134 and may include what is referred to as a Position Determination Entity (PDE). The PDE is coupled to a GPS receiver 192 for receiving signals and decoding information transmitted by GPS system 154. Mobile device 102 is able to receive GPS information from GPS system 154 and location server 190 using the same RF transceiver 108 utilized for typical voice and data communications (or by sharing at least a portion thereof). Thus, a separate GPS receiver is not necessary in mobile device 102 for receiving GPS information from GPS system 154. Alternatively, two separate receivers may be utilized.

During operation of mobile device 102, real-time GPS location information may be obtained and sent to a receiving entity. To obtain the GPS location information, mobile device 102 operates with GPS system 154 as well as location server 190 in wireless communication network 104. Conventionally, mobile device 102 obtains GPS acquisition assistance data and uses it to perform what is referred to as a "GPS fix". For the GPS fix, mobile device 102 tunes to a GPS signal frequency of GPS system 154 which is different than that utilized for communications with the cellular network. During the GPS fix, mobile device 102 performs GPS pseudorange measurements based on GPS signals received from GPS system 154. After the GPS fix, mobile device 102 retunes back to the cellular network. Mobile device 102 then sends the GPS pseudorange data to location server 190, which derives the location of mobile device 102 based on it. Location server/PDE 190 may send this location information to the receiving entity and/or to mobile device 102. If received by the mobile station, mobile device 102 may send the location information to the receiving entity.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
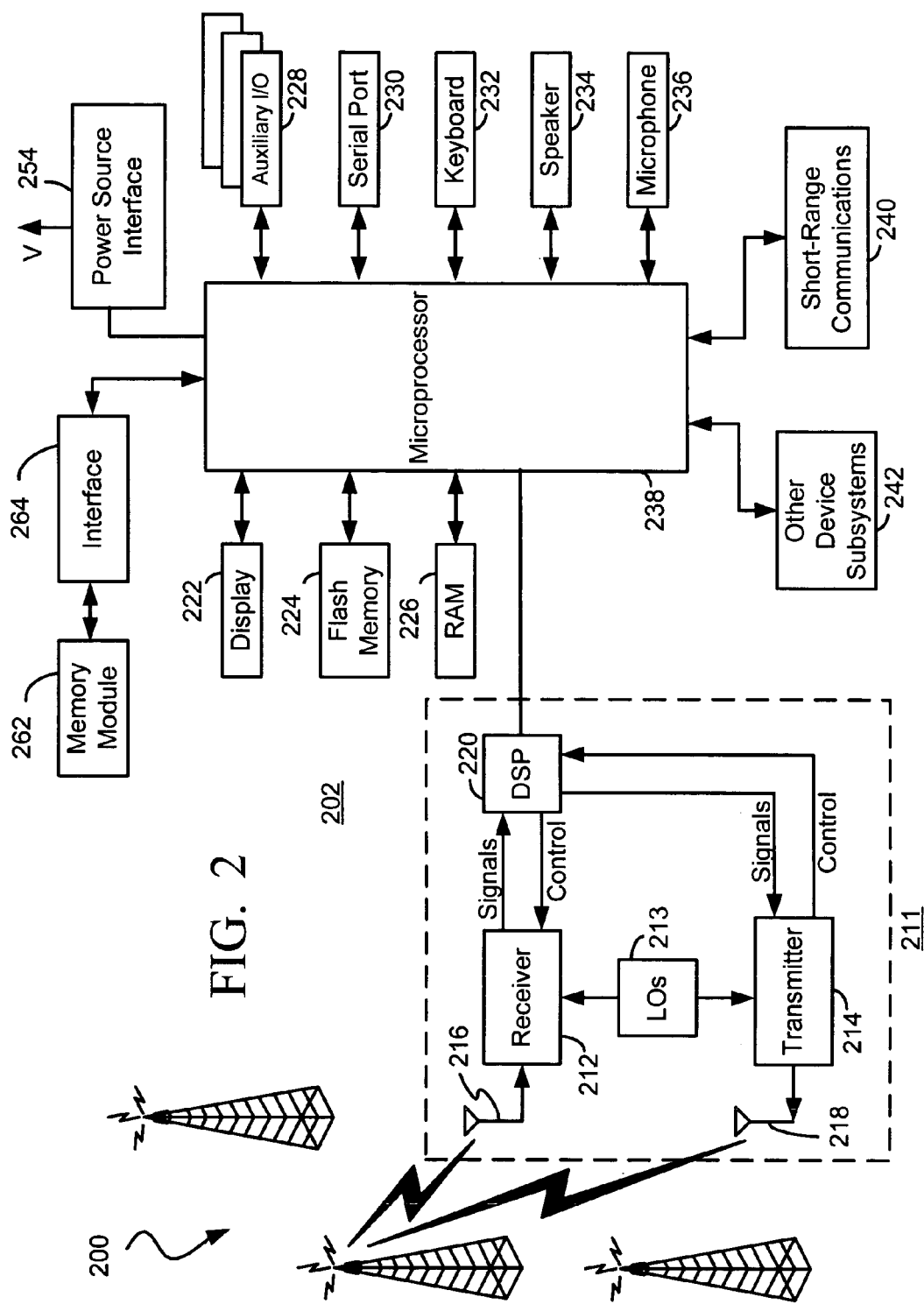
FIG. 2 is a more detailed diagram of a preferred mobile device of FIG. 1.

FIG. 2 is a detailed block diagram of a preferred mobile device, namely a mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area. Mobile station 202 selects or helps select which one of base station transceiver systems 200 it will communicate with.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, a portion of the non-volatile memory or flash memory 224 is programmed with configuration data by a service provider so that mobile station 202 may operate in the network.

Since mobile station 202 is a portable battery-powered device, it also includes a power source interface 254 for receiving different power sources such as a battery or a secondary power source (described in relation to FIG. 1). Such a power source provides electrical power to most if not all electrical circuitry in mobile station 202, and interface 254 provides for a mechanical and electrical connection for it. Power source interface 254 is coupled to a regulator (not shown in FIG. 2) which provides power to all of the circuitry.

Mobile station 202 includes a microprocessor 238 (which is one implementation of controller 106 of FIG. 1) which controls overall operation of mobile station 202. This control includes tolerable delay indication techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG.

Figure 3:
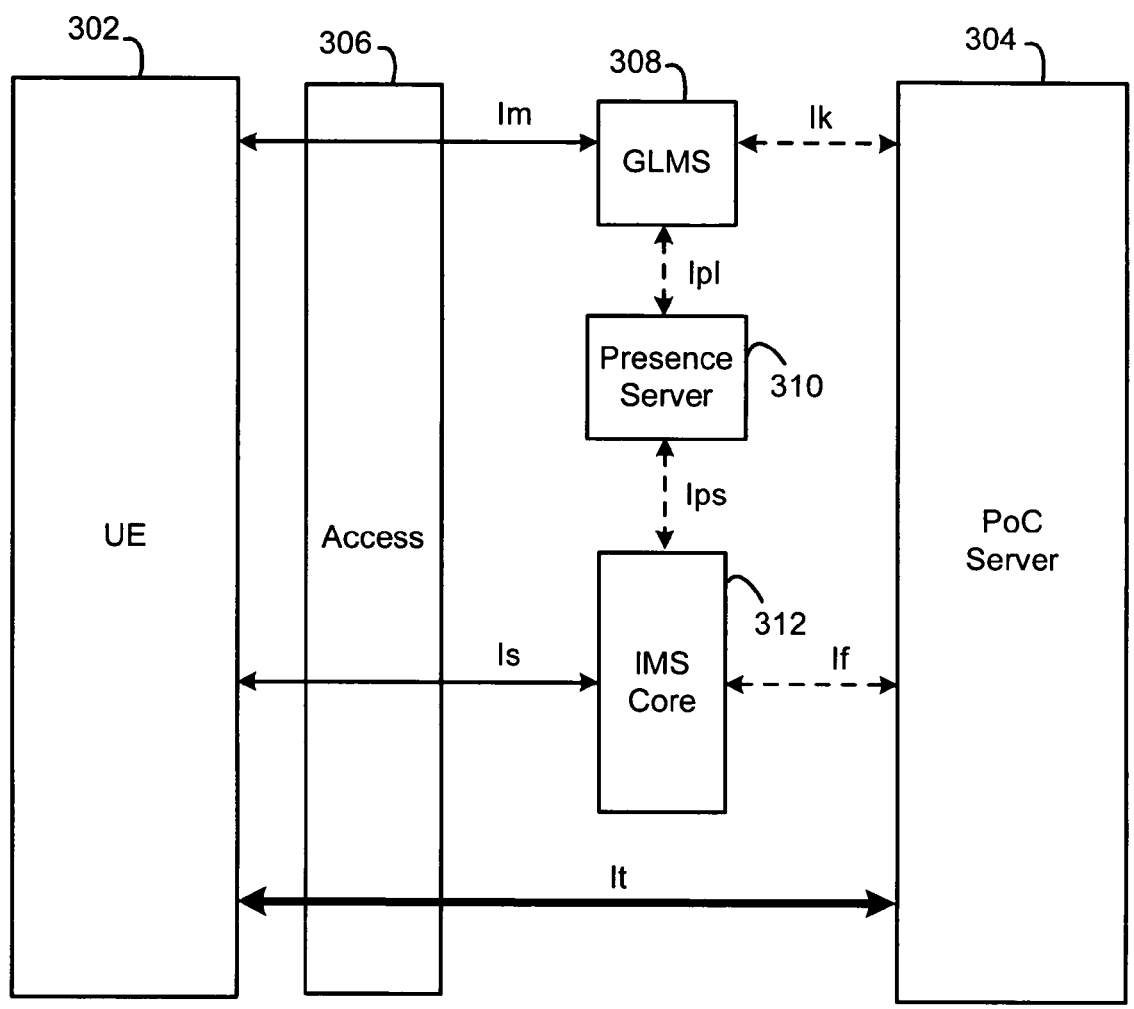
FIG. 3 is a block diagram of system components pertaining to Push-to-talk (PTT) over Cellular (PoC) communication sessions for the mobile station.

FIG. 3 is a block diagram of relevant system components 300 pertaining to Push-to-talk (PTT) over Cellular (PoC) communications which the mobile station may utilize. When the mobile station is utilizing PoC communications, it requests to operate in the reduced slotted mode. Alternatively, the base station may command the mobile station to operate in the reduced slotted mode when necessary. System components 300 include user equipment (UE) 302 which represents a mobile station, a Push-to-talk over Cellular (PoC) server 304, an access 306, a Group and List Management Server (GLMS) 308, an IP Multimedia Subsystem (IMS) core 312, and a presence server 310. Some of these components may be optional or not necessary for fundamental operation. The PoC architecture and signaling may be the same as is conventional as described in current standard specifications such as Push-to-talk over Cellular (PoC), Architecture, PoC Release 1.0—Architecture V1.1.0 (2003-08) Technical Specification; and Push-to-talk over Cellular (PoC), Signaling Flows, PoC Release 1.0—Signaling Flows V1.1.3 (2003-08) Technical Specification.

A PoC communication session is a session connection between end users of a UE 302, referred to as session "participants", who communicate one at a time in a half-duplex manner. PoC communication utilizes Voice over IP (VoIP) technology which involves the communication of data packets carrying voice information. UE 302 is terminal equipment (e.g. a mobile station) which includes PoC application client software, which includes functionality of the present application but otherwise utilizes conventional techniques. IMS core 312 includes a plurality of Session Initiation Protocol (SIP) proxies and SIP registrars. The first point of contact for UE 302 is one of the proxies in IMS core 312 that is configured on UE 302 as the outbound proxy. In the IMS architecture, the outbound proxy is known as the Proxy-CSCF (P-CSCF). IMS Core 312 performs the following functions: (1) routing of SIP signaling between UE 302 and PoC server 304; (2) termination of SIP compression from UE 302; (3) authentication and authorization; (4) maintenance of the registration state and the SIP session state; and (5) reporting to the charging system. UE 302 sends all its SIP messages to the IP address of the outbound proxy after resolving the SIP Uniform Resource Identifier (URI) of the outbound proxy to an IP address.

End users use GLMS 308 to manage groups, contact lists, and access lists. A contact list is a type of address book that may be used by end users to establish an instant talk session with other PoC users or PoC Groups. An end user may have one or several contact lists including identities of other PoC users or PoC groups. Contact list management includes operations to allow UE 302 to store and retrieve the contact lists located in GLMS 308. End users can define PoC groups. An end user may select one group from the list to initiate an instant group talk session or a chat group talk session, depending on the type of group. An access list is used by the end user as a means of controlling who is allowed to initiate instant talk sessions to the end user. An access list contains end user defined identities of other end users or groups. The end user may have one blocked identities list and one granted identities list.

PoC server 304 includes functionality to perform the PoC service. PoC Server 304 typically performs functions such as: (1) end-point for SIP signaling; (2) end-point for real-time transport protocol (RTP) and RTP Control Protocol (RTCP) signaling; (3) SIP session handling; (4) policy control for access to groups; (5) group session handling; (6) access control; (7) do-not-disturb functionality; (8) floor control functionality (floor control is a control mechanism that arbitrates requests, from the UEs, for the right to speak); (9) talker identification; (10) participant information; (11) quality feedback; (12) charging reports; and (13) media distribution. Presence server 310 manages presence information that is uploaded by presence user/network/external agents, and is responsible for combining the presence-related information for a certain presentity from the information it receives from multiple sources into a single presence document.

An Is interface supports the communication between UE 302 and IMS core 312. This communication includes SIP procedures which support the PoC features. The protocol for the Is interface is Session Initiation Protocol (SIP). Is signaling is transported on User Datagram Protocol (UDP). The protocols over an If interface support the communication between IMS core 312 and PoC server 304 for session control. The protocols over an It interface support the transport of talk bursts, floor control, and link quality messages between UE 302 and PoC Server 304. The protocols over an Im interface support the communication between UE 302 and GLMS 308 for the purpose of managing the groups, contact lists and access lists and Do-not-Disturb indication. HTTP/XML protocols are utilized for these purposes. The protocols over an Ik interface support the communication between PoC Server 304 and GLMS 308, enabling PoC server 304 to retrieve the groups and access lists from GLMS 308. The protocols over an Ips interface enable the uploading of the registration status from IMS core 312 to presence server 310 and the dissemination of the presence information between presence server 310 and UE 302. The protocol over an Ipl interface enables the uploading of Do-not-Disturb status and granted/blocked access lists from GLMS 308 to presence server 310. The group identity used on the Is interface between the UE and IMS core for group talk is generated by GLMS 308.

Each entity in the PoC system is assigned one or more IP addresses belonging to public or private IP realms. On the other hand, a end user may address another user by a phone number. UE 302 sends a phone number to IMS core 312 in a TEL Uniform Resource Locator (URL). The phone number may use the international E.164 format (prefixed with a '+' sign) or a local format using a local dialing plan and prefix. IMS core 312 interprets the phone number with a leading '+' to be an E.164 number. Addressing by TEL URL for a PoC session requires that PoC Server 304 can resolve the TEL URL to a SIP URI, for instance by using DNS/ENUM or other local data base. A phone number in a local format is converted to the E.164 format before DNS/ENUM is used.

End users may initiate PoC talk sessions. An INVITE request on the Is interface contains an "Accept-Contact" header with a media feature tag indicating the PoC service. IMS core 312 is able to identify the request as a PoC communication by inspecting the Accept-Contact header. A Request-URI of the INVITE contains either the pre-configured ad-hoc identity (for instant personal talk and ad-hoc instant group) or a group identity (for instant group talk or chat group talk). Early session establishment is used for having a session available for quick connection establishment using "REFER". The early session establishment's INVITE does not have any referred party field and can be differentiated from this against other INVITEs. A transient group identity is generated by PoC server 304 and distributed to UE 302 in the "Contact" header. From an initiating UE 302, the public user identity of the inviting user is included in the "From" header. On the signaling towards the invited user, the "From" header includes either the public user identity (instant personal talk, ad-hoc instant group) or the group identity (instant group talk or being added to a chat group).

Figure 4:
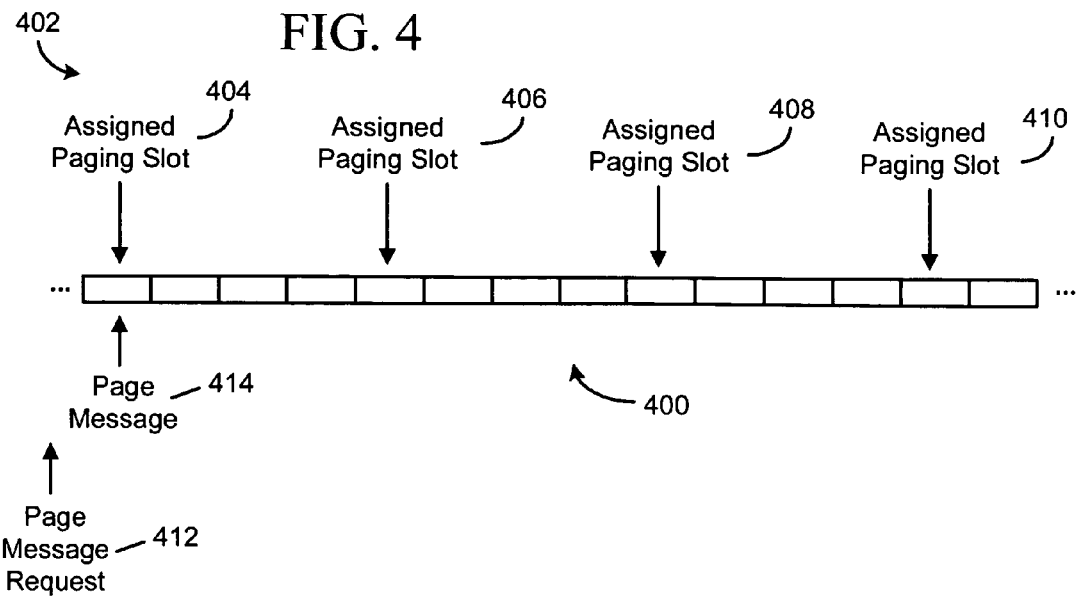
FIG. 4 is an illustrative representation of paging slots for the communication of page messages to the mobile station.

FIG. 4 is an illustrative representation of a plurality of paging slots 400 for the communication of page messages to a mobile device. The plurality of paging slots 400 have a plurality of assigned paging slots 402 for the mobile device which include paging slots 404, 406, 408, and 410. These paging slots are regular or periodic, and separated in time by a fixed time period. All other paging slots in between the assigned paging slots 402 shown in FIG. 4 are not assigned to the mobile device, and provide time periods during which the mobile device may operate in a sleep mode or perform other transceiver operations.

When operating in a normal slotted mode, the mobile device wakes up to monitor for page messages in paging slots at predetermined intervals. For example, in CDMA communications defined by IS-2000, the mobile device wakes up to monitor for page messages in paging slots at an interval of 1.28*2^i seconds, where i is an integer value ranging from 0 to 7. The value of i is referred to as a "Slot Cycle Index" and is chosen by the mobile device and registered with the network. Slotted messaging has been utilized in wireless communication networks for many years in an effort to conserve battery power in mobile devices. In Release D of IS-2000, a new feature that allows mobile devices to operate in a "reduced slotted mode" while idling and monitoring for pages has been defined. Specifically, the reduced slotted mode allows values of −4 to −1 for the Slot Cycle Index i. This enables faster call setup times for mobile-terminated calls. A shortened slot cycle for faster call setup is highly desirable for certain applications such as Push-To-Talk (PTT) communication applications. Note that the reduced slotted mode may be negotiated between the mobile device and the network at the time of call release, for example. In this case, the agreed upon value of i for the reduced slotted mode is active for a period of time before the mobile device and the network revert to the prior value of i for the normal slotted mode. Furthermore, when the mobile device is idle a new value of i can be negotiated to be active for a period of time.

Another reason that a mobile device may request to operate in the reduced slotted mode is unrelated to the need for fast call setup or PTT communications. In particular, if a mobile device is operating with a relatively high capacity or large power source (e.g. a wall power source, an automobile power source, or a PC power source through USB connection), it may request a shortened slot cycle as power savings is not a concern. The mobile device requests the reduced slot cycle in order to benefit from reduced call setup times even when another feature that requires it (e.g. PTT communications) is not active.

In conventional operation, the wireless network receives a page message request 412 for paging the mobile device and must send a page message 414 corresponding thereto in the first available paging slot 404 assigned to the mobile device. If the network has more pages queued for paging slot 404 than can actually fit into paging slot 404, however, the infrastructure has no way to appropriately prioritize them. This becomes more problematic when many mobile devices in the wireless network are operating in the reduced slotted mode. Some of the pages may be destined for mobile devices having active PTT communications that require fast call setup, whereas other pages may be destined for mobile devices that do not necessarily require the fast call setup (e.g. high capacity power source use).

Figure 5:
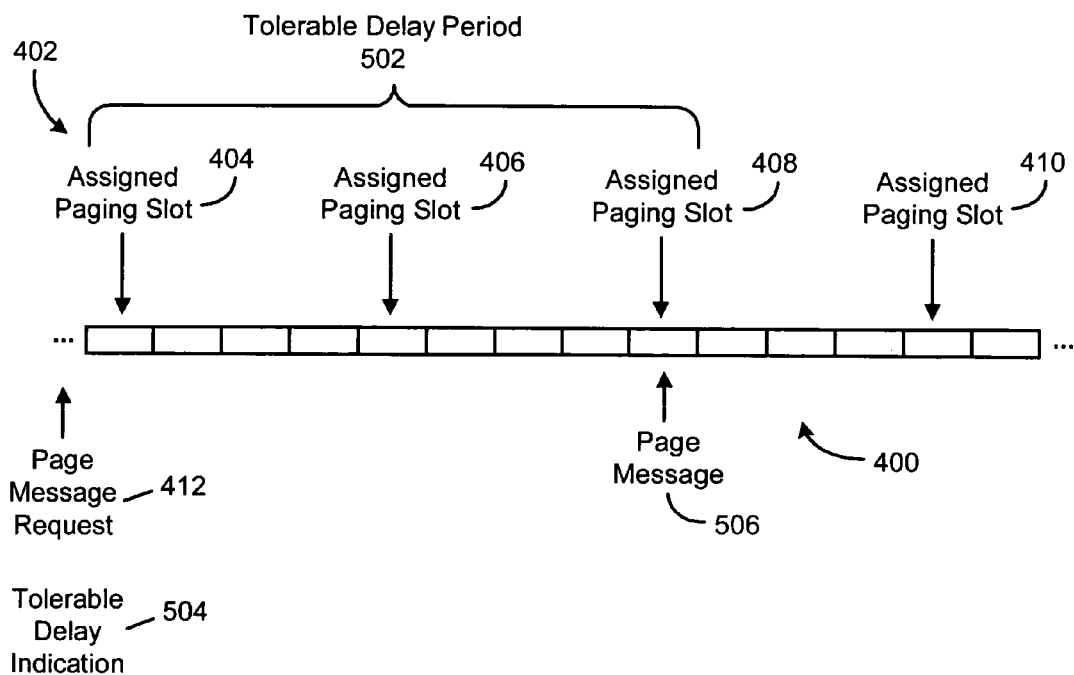
FIG. 5 is an illustrative representation of paging slots for the communication of page messages to the mobile station with a tolerable delay.

FIG. 5 is an illustrative representation of the plurality of paging slots 400 of FIG. 4 for the communication of page messages to the mobile device, using a tolerable delay indication associated with the mobile device. Tolerable delay indication 504 associated with the mobile device is utilized within the wireless network to provide a tolerable delay period 502 within which page messages should be sent to the mobile device. Specifically, tolerable delay indication 504 represents a time period or a number of paging slots within which the page messages should be delivered to the mobile device. Tolerable delay period 502 is typically greater than or equal to two or more paging slot time periods. In the wireless network, page message requests to mobile devices that are not associated with tolerable delay indications are prioritized over page message requests to mobile devices that are associated with tolerable delay indications.

Thus, the wireless network may defer or refrain from causing a page message for the mobile device associated with tolerable delay indication 504 to be transmitted within assigned paging slot 404 when a paging capacity limit of paging slot 404 is reached. The wireless network may instead cause a deferred page message 506 to be transmitted within one or more subsequent paging slots 408 assigned to the mobile device within tolerable delay period 502 associated with tolerable delay indication 504.

Tolerable delay indication 504 may be as simple as a binary indication or a bit flag, where '0'=no tolerable delay and '1'=tolerable delay=predetermined time period T or number of paging slots N. Alternatively, tolerable delay indication 504 may be a value that is correlated to the time period or number of paging slots within which page messages must be sent. Tolerable delay indication 504 may be associated with all known mobile devices which operate in a normal call mode (in contrast to a PTT communication mode) and with a high capacity power source. Such indications 504 may be sent from the mobile devices to the network, or inferred by the network based on other data associated with the mobile device which reveals such operation.

Figure 6:
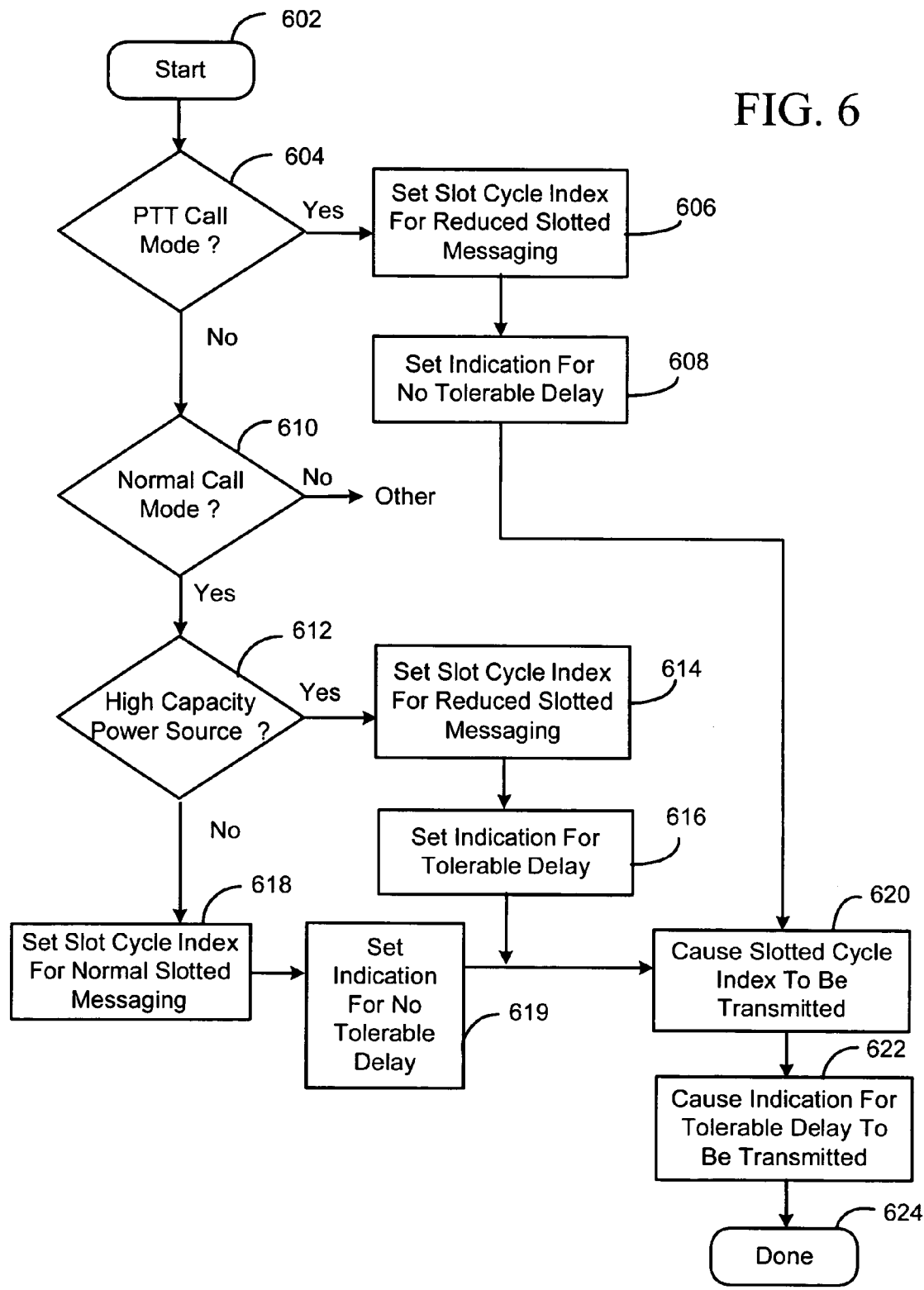
FIG. 6 is a flowchart for describing a mobile device method of providing a tolerable delay for slotted messages in the wireless network.

FIG. 6 is a flowchart for describing a mobile device method of providing a tolerable delay for slotted messages in the wireless network. The method of FIG. 6 is performed by a mobile device operating in a wireless network (e.g. see FIGS. 1-2). As described in relation to FIGS. 1-2, the mobile device may include a wireless transceiver, an antenna coupled to the wireless transceiver, and one or more processors coupled to these components and operative to perform the acts of the method. The mobile device may also include the power source interface as described in FIGS. 1-2. Also, a computer program product of the present application may include computer instructions stored on a storage medium (memory, a floppy disk or CD-ROM) which are written in accordance with the described logic.

Beginning at a start block 602, the mobile device identifies whether it is switching to operate in a Push-To-Talk (PTT) communication mode (step 604 of FIG. 6). Specifically, this may be the PoC communication mode described earlier in relation to FIG. 3. If the PTT mode is identified in step 604, then the mobile device causes the Slot Cycle Index to be set for reduced slotted messaging by selecting one of the appropriate index values (step 606 of FIG. 6). The mobile device also causes no indication for tolerable delay to be set, or alternatively sets an indication for no tolerable delay (step 608 of FIG. 6). If the PTT mode is not identified in step 604, then the mobile device identifies whether it must switch to operate in a normal call mode (step 610 of FIG. 6). The normal call mode may include, for example, conventional cellular voice telephony communications and/or data communications such as e-mail, text message, or Internet data communications.

If the normal call mode is identified in step 610, then the mobile device identifies whether a high capacity power source is connected or being utilized (step 612 of FIG. 6). If the high capacity power source is utilized in step 612, then the mobile device causes the Slot Cycle Index to be set for reduced slotted messaging by selecting one of the appropriate index values (step 614 of FIG. 6). The mobile device also causes an indication for tolerable delay to be set (step 616 of FIG. 6). If the high capacity power source is not being utilized in step 612, then the mobile device causes the Slot Cycle Index to be set for normal slotted messaging by selecting one of the appropriate index values (step 618 of FIG. 6). The mobile device also causes no indication for tolerable delay to be set, or sets an indication for no tolerable delay (step 619 of FIG. 6). After such processing, the mobile device causes the Slot Cycle Index to be transmitted to the network (step 620 of FIG. 6) as well as any indication for tolerable delay (step 622 of FIG. 6). Preferably, these data are sent to the wireless network in the same message or set of messages.

The flowchart of FIG. 6 finishes at a done block 624, but the method may repeat when another transition event occurs for the mobile device. Thus, for example, if the mobile device is utilizing the secondary power source and operating with the tolerable delay, and subsequently the secondary power source is disconnected from the mobile device, an indication for terminating the tolerable delay is sent by the mobile device to the wireless network. The mobile device thereafter monitors each paging slot to receive a page message in a paging slot with no expected tolerable delay.

As an alternative to the mobile device sending such tolerable delay indications to the wireless network in response to predetermined conditions (i.e. a high capacity power source), the wireless network may have network profile information associated with the mobile device which is indicative of the tolerable delay usage by the mobile device. On the other hand, the wireless network may infer such tolerable delay indications from mobile devices based on other data communicated from the mobile device or upon active services of the mobile device. For example, the wireless network may infer a tolerable delay for the mobile device if the slot cycle index for the mobile device is small (e.g. below a threshold value) and PTT mode is inactive for the mobile device.

FIG. 7 is a flowchart for describing a network method of providing a tolerable delay for slotted messages in the wireless network. The method of FIG. 7 is performed by a network processing component within the wireless network (e.g. see FIG. 1. The network processing component may be included within the base station controller or the base station, for example, depending on the specific implementation. The network processing component may include one or more processors; memory coupled to the one or more processors; and computer instructions stored in the memory and executable by the one or more processors to perform the acts of the method. Also, a computer program product of the present application may include computer instructions stored on a storage medium (memory, a floppy disk or CD-ROM) which are written in accordance with the described logic.

Beginning at a start block 702 of FIG. 7, the wireless network receives a plurality of new page message requests for paging mobile devices which operate in the network (step 704 of FIG. 7). Next, the wireless network identifies all page message requests which may be provided within the current paging slot (step 706 of FIG. 7). The wireless network then identifies those requests for mobile devices which may withstand tolerable delays, and those requests for mobile device which may not withstand any tolerable delay. Next, the wireless network provides page messages for these requests within the current paging slot, prioritizing those requests for mobile devices that do not withstand any tolerable delay and others having tolerable delay periods which have almost expired (step 708 of FIG. 7).

The wireless network continues to perform this processing while identifying whether all requests have been handled (step 710 of FIG. 7) and whether a paging capacity limit of the current paging slot has been reached (step 712 of FIG. 7). The paging capacity limit of the paging slot is reached when the paging slot is completely full of page messages and other information, without room for any other page message. If all requests are served within the current paging slot before the paging capacity limit is reached, then the wireless network causes the page messages for the current paging slot to be transmitted (step 716 of FIG. 7). If the paging capacity limit of the current paging slot has been reached before all requests are served, however, then the wireless network refrains from including at least some page messages within the current paging slot for mobile devices which allow tolerable delay (step 714 of FIG. 7). The subset of page messages are then transmitted within the current paging slot (step 716 of FIG. 7).

As described, page message requests for mobile devices with tolerable delay periods which have almost expired are treated with the same priority as page message requests having no tolerable delay. The wireless network keeps a counter or timer associated with each page message request having an associated tolerable delay; the value of the counter or timer is set in accordance with the tolerable delay indication and started upon receipt of the page message request. Once the counter or timer has almost expired, the tolerable delay period is almost over and the page message request is treated with the same priority as the other page message requests having no tolerable delay. Therefore, the wireless network subsequently causes a page message for the mobile device with the tolerable delay indication to be transmitted within a subsequent paging slot within a tolerable delay period associated with the tolerable delay indication.

Thus, methods and apparatus for providing a tolerable delay for slotted messages in a wireless communication network have been described. In one illustrative example, a plurality of page message requests for a plurality of mobile devices which operate in the wireless network are received. One or more paging slots assigned to the mobile devices are identified for transmitting a plurality of page messages in response to these requests. However, the wireless network refrains from causing a page message for a mobile device associated with a tolerable delay indication to be transmitted within the one or more paging slots when a paging capacity limit of the one or more paging slots is reached. This allows higher priority page messages to be transmitted within the one or more paging slots. The wireless network subsequently causes a page message for the mobile device with the tolerable delay indication to be transmitted within one or more subsequent paging slots within a tolerable delay period associated with the tolerable delay indication. The mobile device may transmit the tolerable delay indication to the wireless network in response to identifying a predetermined condition, for example, identifying the use of a high capacity power source at the mobile device.

In a related mobile device technique, the method includes the steps of causing a tolerable delay indication to be transmitted to a wireless communication network; and monitoring each paging slot of a plurality of paging slots to receive page messages from the wireless network, each paging slot being separated in time by a fixed time period, each page message being received within a tolerable delay period greater than or equal to two or more of the fixed time periods corresponding to the tolerable delay indication. The tolerable delay indication may be sent to the wireless network based on identifying a predetermined condition (e.g. a predetermined power source being connected) at the mobile device.

The above-described embodiments of the present application are intended to be examples only. Those of skill in the art may effect alterations, modification, and variations to the particular embodiments without departing from the scope of the application. The invention described herein in the recited claims intends to cover and embrace all suitable changes in technology.

What is claimed is:

1. A method for use in providing a tolerable delay for the communication of page messages for establishing calls via a wireless communication network, the method comprising the acts of:
receiving, in the wireless network, a plurality of page message requests for a plurality of mobile devices which operate in the wireless network including a mobile communication device associated with a tolerable delay indication;
identifying one or more paging slots for transmitting a plurality of page messages for establishing calls with the mobile devices in response to the page message requests; and
deferring a transmission of one of the page messages for establishing a call with the mobile communication device based on identifying the tolerable delay indication for the mobile communication device, the transmission being deferred to one or more subsequent paging slots within a tolerable delay period associated with the tolerable delay indication.

2. The method of claim 1,
wherein the page messages for establishing the calls comprise calls for voice or data communications.

3. The method of claim 1, further comprising:
alternatively causing the page message for the mobile communication device associated with the tolerable delay indication to be transmitted within the one or more paging slots when there is paging capacity within the one or more paging slots.

4. The method of claim 1,
wherein the act of deferring the transmission of the page message comprises the further act of deferring the transmission of the page message based on further identifying that a paging capacity limit of the one or more paging slots has been reached.

5. The method of claim 1, wherein the tolerable delay indication includes a number of paging slots indicative of the tolerable delay period.

6. The method of claim 1, wherein the tolerable delay indication includes a time period indicative of the tolerable delay period.

7. The method of claim 1, further comprising:
receiving, via the wireless network, the tolerable delay indication from the mobile communication device.

8. The method of claim 1, further comprising:
receiving, via the wireless network, the tolerable delay indication from the mobile communication device in response to a predetermined condition at the mobile communication device.

9. The method of claim 1, being performed by a network processing component within the wireless network.

10. The method of claim 1, wherein the wireless communication network comprises a Code Division Multiple Access (CDMA) network.

11. The method of claim 5, wherein the number of paging slots has a value between 0 and N.

12. The method of claim 1, further comprising:
receiving, via the wireless network, the tolerable delay indication from the mobile communication device when the mobile communication device is connected to a high capacity power source.

13. A computer program product, comprising:
a computer readable medium;
computer instructions stored on the computer readable medium;
the computer instructions being executable by one or more processors in a wireless communication network for use in providing a tolerable delay for the communication of page messages by:
receiving a plurality of page message requests for a plurality of mobile devices which operate in the wireless communication network including a mobile communication device associated with a tolerable delay indication;
identifying one or more paging slots for transmitting a plurality of page messages for establishing calls to the mobile devices in response to the page message requests; and
deferring a transmission of one of the page messages for establishing a call with the mobile communication device based on identifying the tolerable delay indication for the mobile communication device, the transmission being deferred to one or more subsequent paging slots within a tolerable delay period associated with the tolerable delay indication.

14. The computer program product of claim 13, wherein the
wherein the page messages for establishing the calls comprise calls for voice or data communications.

15. The computer program product of claim 13, wherein the computer instructions are further executable for:
alternatively causing the page message for the mobile communication device associated with the tolerable delay indication to be transmitted within the one or more paging slots assigned to the mobile communication device when there is paging capacity within the one or more paging slots.

16. The computer program product of claim 13, wherein the computer instructions are further executable for:
deferring the transmission of the page message based on further identifying that a paging capacity limit of the one or more paging slots has been reached.

17. The computer program product of claim 13, wherein the tolerable delay indication includes a number of paging slots indicative of the tolerable delay period.

18. The computer program product of claim 13, wherein the tolerable delay indication includes a time period indicative of the tolerable delay period.

19. The computer program product of claim 13, wherein the computer instructions are further executable for:
receiving, via the wireless network, the tolerable delay indication from the mobile communication device.

20. The computer program product of claim 13, wherein the computer instructions are further executable for:
receiving, via the wireless network, the tolerable delay indication from the mobile communication device in response to a predetermined condition at the mobile communication device.

21. A network processing component for use within a wireless communication network, the network processing component comprising:
one or more processors;
memory coupled to the one or more processors;
computer instructions stored in the memory;
the computer instructions being executable by the one or more processors for providing a tolerable delay for the communication of page messages for establishing calls by:
receiving a plurality of page message requests for a plurality of mobile devices which operate in the wireless network including a mobile communication device associated with a tolerable delay indication;
identifying one or more paging slots for transmitting a plurality of page messages for establishing calls to the mobile devices in response to the page message requests; and
deferring a transmission of one of the page messages for establishing a call with the mobile communication device based on identifying the tolerable delay indication for the mobile communication device, the transmission being deferred to one or more subsequent paging slots within a tolerable delay period associated with the tolerable delay indication.

22. The network processing component of claim 21, wherein the page messages for establishing the calls comprise calls for voice or data communications.

23. The network processing component of claim 21, wherein the computer instructions are further executable for:
alternatively causing the page message for the mobile communication device associated with the tolerable delay indication to be transmitted within the one or more paging slots assigned to the mobile communication device when there is paging capacity within the one or more paging slots.

24. The network processing component of claim 21, wherein the computer instructions are further executable for:
deferring the transmission of the page message based on further identifying that a paging capacity limit of the one or more paging slots has been reached.

25. The network processing component of claim 21, wherein the tolerable delay indication includes a number of paging slots indicative of the tolerable delay period.

26. The network processing component of claim 21, wherein the tolerable delay indication includes a time period indicative of the tolerable delay period.

27. The network processing component of claim 21, wherein the computer instructions are further executable for:
receiving, via the wireless network, the tolerable delay indication from the mobile communication device.

28. The network processing component of claim 21, wherein the computer instructions are further executable for:
receiving, via the wireless network, the tolerable delay indication from the mobile communication device in response to a predetermined condition at the mobile communication device.

29. The network processing component of claim 21, which is part of the wireless communication network comprising a Code Division Multiple Access (CDMA) network.

30. The network processing component of claim 25, wherein the number of paging slots has a value between 0 and N.

31. The network processing component of claim 21, wherein the computer instructions are further executable for:
receiving, via the wireless network, the tolerable delay indication from the mobile communication device when the mobile communication device is connected to a high capacity power source.

32. A method for use in providing a tolerable delay for the communication of page messages to a mobile communication device in a wireless communication network, the method comprising the steps of:
causing a tolerable delay indication to be sent to the wireless network from the mobile device; and
monitoring, at the mobile device, each paging slot of a plurality of paging slots of the wireless network for a page message for establishing a call for the mobile device, each paging slot being separated in time by a fixed time period, such that the page message is received within a finite tolerable delay period greater than or equal to two or more of the fixed time periods indicated by the tolerable delay indication.

33. The method of claim 32, wherein the tolerable delay indication includes a number of paging slots indicative of the finite tolerable delay period.

34. The method of claim 32, wherein the tolerable delay indication includes a time period indicative of the finite tolerable delay period.

35. The method of claim 32, further comprising:
identifying a predetermined condition; and
causing the tolerable delay indication to be sent to the wireless network based on identifying the predetermined condition.

36. The method of claim 32, further comprising:
identifying that a predetermined power source is connected to the mobile device; and causing the tolerable delay indication to be sent to the wireless network based on identifying that the predetermined power source is connected to the mobile device.

37. The method of claim 32, further comprising:
causing an indication to be transmitted to the wireless network, the indication being indicative for terminating the tolerable delay; and
after transmitting the indication: monitoring each paging slot of the plurality of paging slots to receive a page message in a paging slot with no tolerable delay.

38. The method of claim 32, wherein the mobile device is adapted to communicate in accordance with a Code Division Multiple Access (CDMA) standard.

39. A computer program product, comprising:
a computer readable medium;
computer instructions stored in the computer readable medium;
the computer instructions being executable by one or more processors of a mobile communication device for:
causing a tolerable delay indication to be sent to a wireless communication network from the mobile device; and
monitoring, at the mobile device, each paging slot of a plurality of paging slots of the wireless network for a page message for establishing a call for the mobile device, each paging slot being separated in time by a fixed time period, such that the page message is received within a finite tolerable delay period greater than or equal to two or more of the fixed time periods indicated by the tolerable delay indication.

40. The computer program product of claim 39, wherein the tolerable delay indication includes a number of paging slots indicative of the finite tolerable delay period.

41. The computer program product of claim 39, wherein the tolerable delay indication includes a time period indicative of the finite tolerable delay period.

42. The computer program product of claim 39, wherein the computer instructions are further executable for:
identifying a predetermined condition; and
causing the tolerable delay indication to be sent to the wireless network based on identifying the predetermined condition.

43. The computer program product of claim 39, wherein the computer instructions are further executable for:
identifying that a predetermined power source is connected to the mobile device; and
causing the tolerable delay indication to be sent to the wireless network based on identifying that the predetermined power source is connected to the mobile device.

44. The computer program product of claim 39, wherein the computer instructions are further executable for:
causing an indication to be transmitted to the wireless network, the indication being indicative for terminating the tolerable delay; and
after transmitting the indication: monitoring each paging slot of the plurality of paging slots to receive a page message in a paging slot with no tolerable delay.

45. A mobile communication device, comprising:
a wireless transceiver operative for radio communications with a wireless communication network;
an antenna coupled to the wireless transceiver;
one or more processors coupled to the wireless transceiver;
the one or more processors being operative to:
cause a tolerable delay indication to be transmitted to the wireless network via the wireless transceiver; and
monitor, via the wireless transceiver, each paging slot of a plurality of paging slots for a page message for establishing a call for the mobile device, each paging slot being separated in time by a fixed time period, such that the page message is received within a finite tolerable delay period greater than or equal to two or more of the fixed time periods indicated by the tolerable delay indication.

46. The mobile device of claim 45, wherein the tolerable delay indication includes a number of paging slots indicative of the finite tolerable delay period.

47. The mobile device of claim 45, wherein the tolerable delay indication includes a time period indicative of the finite tolerable delay period.

48. The mobile device of claim 45, wherein the one or more processors are further operative to:
identify a predetermined condition; and
cause the tolerable delay indication to be sent to the wireless network based on identifying the predetermined condition.

49. The mobile device of claim 45, wherein the one or more processors are further operative to:
identify that a predetermined power source is coupled to the mobile device; and
cause the tolerable delay indication to be sent to the wireless network based on identifying that the predetermined power source is coupled to the mobile device.

50. The mobile device of claim 45, wherein the one or more processors are further operative to:
cause an indication to be transmitted to the wireless network, the indication being indicative for terminating the tolerable delay; and
after transmitting the indication: monitor each paging slot of the plurality of paging slots to receive a page message in a paging slot with no tolerable delay.

51. The mobile device of claim 45, which is adapted to operate in accordance with a Code Division Multiple Access (CDMA) standard.

* * * * *